United States Patent [19]

Dawless

[11] 4,312,847

[45] * Jan. 26, 1982

[54] SILICON PURIFICATION SYSTEM

[75] Inventor: Robert K. Dawless, Monroeville, Pa.

[73] Assignee: Aluminum Company of America, Pittsburgh, Pa.

[*] Notice: The portion of the term of this patent subsequent to Jan. 20, 1998, has been disclaimed.

[21] Appl. No.: 185,596

[22] Filed: Sep. 9, 1980

Related U.S. Application Data

[63] Continuation-in-part of Ser. No. 41,892, May 24, 1979, Pat. No. 4,256,717.

[51] Int. Cl.³ .................... B01D 9/00; C01B 33/02
[52] U.S. Cl. .......................... 423/348; 23/295 R; 23/296; 156/DIG. 64
[58] Field of Search ............... 423/348; 156/DIG. 64; 62/533, 543; 23/295 R, 296

[56] References Cited

U.S. PATENT DOCUMENTS

| | | |
|---|---|---|
| 2,471,899 | 5/1949 | Regner . |
| 2,651,922 | 9/1953 | Graham .................... 62/543 |
| 2,866,701 | 12/1958 | Strauss . |
| 3,008,887 | 11/1961 | Herglotz . |
| 3,069,240 | 12/1962 | Armand ..................... 423/348 |
| 3,097,068 | 7/1963 | Litz et al. ................... 423/348 |
| 3,933,981 | 1/1976 | Wakefield et al. . |
| 4,094,731 | 6/1978 | Keyser et al. ............... 423/348 |
| 4,246,249 | 1/1981 | Dawless ..................... 423/348 |
| 4,256,717 | 3/1981 | Dawless ..................... 423/348 |

FOREIGN PATENT DOCUMENTS

| | | | |
|---|---|---|---|
| 874547 | 8/1961 | United Kingdom | 423/348 |
| 593708 | 5/1976 | U.S.S.R. | 62/533 |

OTHER PUBLICATIONS

Litz et al., "Second Joint AIChe Meeting", May 19-22, 1968, Preprint 37B.

Primary Examiner—Jack Cooper
Attorney, Agent, or Firm—Andrew Alexander

[57] ABSTRACT

A method for purifying silicon comprises the steps of providing a body of molten silicon-rich material and extracting heat therefrom to provide a solid phase containing silicon in crystal form and to concentrate impurities in a molten phase. After a desired amount of heat has been extracted, a substantial part of the molten phase is separated from the solid phase. A fraction or portion of the solid phase is remelted for purposes of removing solvent metal, including impurities, from the crystals, and at least one fraction of the remelted material is separated from the crystals.

10 Claims, 4 Drawing Figures

SILICON PURIFICATION SYSTEM

CROSS REFERENCE TO RELATED APPLICATIONS

This application is a continuation-in-part of U.S. Ser. No. 41,892, filed May 24, 1979, entitled "Silicon Purification Method", now U.S. Pat. No. 4,256,717.

INTRODUCTION

This invention relates to purification of silicon and more particularly it relates to the purification of silicon using fractional crystallization.

Because of the increasing interest in converting sunlight into electricity by use of a photovoltaic cell, there has been a considerable increase in demand for semiconductor materials such as silicon. For use in such applications the silicon has to be quite pure, e.g. 99.99 wt.% or greater, adding greatly to its cost. Thus, for purposes of making such cells competitive with other sources of electricity, there is a great need for a method for providing high purity silicon in a highly economical manner.

In the prior art, there are disclosed several different methods for producing purified silicon. For example, Litz et al in a paper entitled "Crystallization of Pure Silicon from Molten Aluminum" presented at the Second Joint AIChE Meeting, May 19-22, 1968 (preprint 37B) disclose purifying silicon by continuous recrystallization of commercial silicon from molten aluminum using a thermal connection loop. However, Litz et al note that the drawing force for circulation of fluids in the system is the density generated by keeping one vertical portion at a different temperature from another, and that the maximum temperature difference is no more than about 20° C. In U.S. Pat. No. 2,471,899, there is disclosed a method of separating constituents of alloys by fractional crystallization according to which it was recognized that a relatively high drop amounting to from 5° to 20° C. divides the entire volume of the melt under treatment sharply into two regions. One of them is the molten alloy, the other is the zone of the crystallized solid phase. According to the patent, the separation process can be considerably accelerated, and the purity of the liquid phase increased if during the treatment the molten alloy is kept in intensive continuous movement, and so much heat per unit of time is abstracted from the melt by means of a cooled or crystallization surface that the entire higher melting phase separates only on the crystallization surface in a relatively short time and in the form of a very compact layer. Also, in the prior art, it is disclosed (U.S. Pat. No. 3,008,887) that elemental silicon containing trace impurities can be purified by subjecting the silicon to melting within a closed reactor under anhydrous conditions and in the presence of dissociated atomic hydrogen maintained in direct contact with molten silicon being formed and by removing the vaporized reaction product impurities. According to the patent, such process is particularly suitable for purifying boron-contaminated silicon. In addition to the above, U.S. Pat. No. 2,866,701 discloses a method of purifying silicon and ferrosilicon using gaseous carbon dioxide to remove aluminum and calcium by oxidation. However, in spite of the prior art, there still remains a great need for a method for producing high purity silicon in an economical manner. The present invention fulfills that need by providing a highly economical process for purifying silicon in substantial quantity. The process can be used in upgrading silicon to a purity level in the order of about 99.99 wt.% or higher.

SUMMARY OF THE INVENTION

An object of the present invention is to provide a method for purifying silicon.

Another object of the present invention is to provide a method for purifying silicon using fractional crystallization.

Yet another object of the present invention is to provide a method for upgrading silicon in substantial quantity and in a highly economical manner.

These and other objects will become apparent from the drawings, specification and claims appended hereto.

In accordance with these objects there is disclosed a method for purifying silicon comprising providing a body of molten metal having a substantial amount of silicon contained therein. Heat is extracted from the body to provide a solid phase containing silicon in crystal form and to concentrate impurities in the molten phase. In one aspect of the invention, the heat is extracted substantially from the upper or free surface of the body. Simultaneously with extracting the heat, walls confining the body of molten metal should be maintained at a temperature sufficiently high to prevent substantial precipitation of crystals thereon. After a desired amount of heat has been extracted, a substantial part of the molten phase or solvent metal is removed from the solid phase. A fraction or portion of the solid phase is remelted for purposes of removing solvent metal, including impurities from the crystals, and at least one fraction of the remelted material is separated from the crystals.

DETAILED DESCRIPTION OF THE PREFERRED EMBODIMENTS

A material which may be upgraded or beneficiated to recover purified silicon in accordance with the present invention can comprise up to about 99.0 wt.% Si, the remainder being comprised of impurities with respect to silicon. It will be noted that 99.0 wt.% Si has a melting point of about 1410° C. Thus, for purposes of operation at lower temperatures it is preferred that at least one metal selected from the group consisting of tin, zinc, aluminum, silver and lead be provided in or added to the silicon material, the metal acting as a solvent for the silicon material. For example, silver may be added to provide an alloy having a melting point in the range of about 830° C. to 1400° C. Also, alloys such as tin-lead alloys may be used as the solvent material. Typically, the tin-lead alloy can range from about 20 to 50% lead and 50 to 80% tin. A suitable composition is about 80% tin and 20% lead. It will be appreciated that other metal compositions such as tin-zinc can be used and are contemplated within the purview of the subject invention.

Of the group of metals which may be used, aluminum is preferred. A silicon-rich alloy which can be used in the present invention can contain up to 87.4 wt.% aluminum. Small amounts of aluminum are usually utilized on a less preferred basis since lesser amounts result in higher melting points. Thus, with respect to aluminum, for purposes of efficient operation a typical silicon-rich alloy composition can range from 20 to 80 wt.% Si, the remainder aluminum and impurities.

Figure 1:
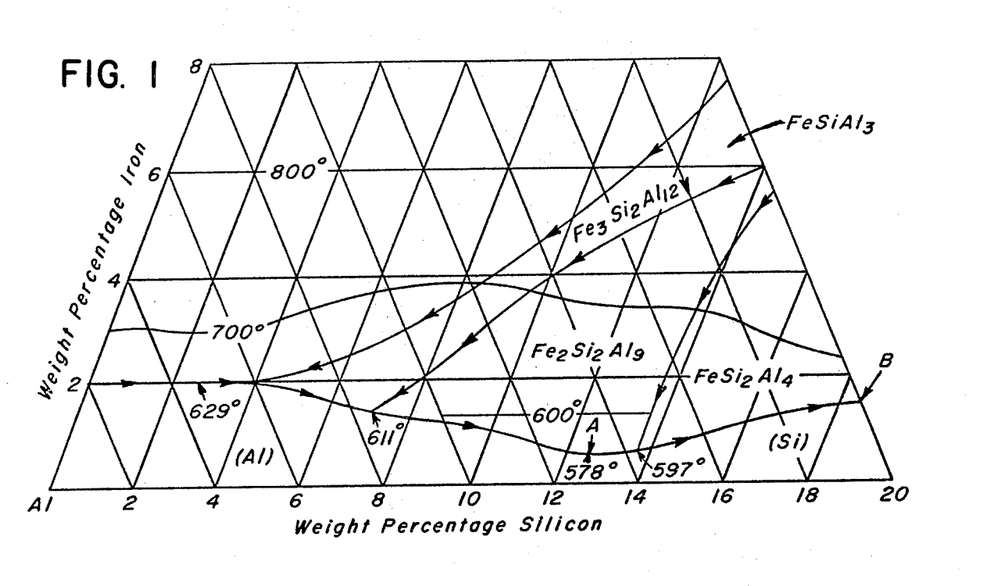
FIG. 1 is a phase diagram of an aluminum-silicon-iron system.

When the silicon to be purified is 99.0 wt.% purity, aluminum, which may be added as noted above, may be commercial grade, e.g. 99.5 wt.% aluminum. However, aluminum having 99.9 wt.% purity is preferred since fewer impurities are added to the system. Further, it will be understood that aluminum-silicon type alloys containing large amounts of silicon may be used without adversely affecting the quality of purified silicon obtained from the process. However, other materials which would be regarded as impurities with respect to silicon should be controlled rather closely in certain instances in order that high purity silicon may be obtained economically. Accordingly, when using aluminum solvent metal, iron should be controlled to a level in the body of molten material or alloy such that during the fractional crystallization process the double saturation line A-B, FIG. 1, is not reached. By controlling the iron content of the molten alloy, intermetallic crystals such as $FeSi_2Al_4$ are avoided thereby aiding in ensuring a higher purity silicon product. For purposes of illustration, the iron content of the molten body to be subjected to fractional crystallization should not be permitted to exceed 0.8 wt.% when it is desired to reduce the temperature of the molten alloy to or close to its eutectic temperature, about 577° C. It will be appreciated that normally, in the process of the present invention, it is desirable to approach the eutectic temperature for purposes of obtaining a high yield of silicon product crystals. However, it will be understood that the higher the temperature above the eutectic temperature at which the fractional crystallization process is stopped, the greater the amount of iron which can be tolerated in the molten alloy. For example, if the crystallization process is stopped at about 660° C., then the level of iron can be as high as 1.5 wt.% without encountering phases containing intermetallic crystals such as $FeSi_2Al_4$, for example, and its attendant problems with respect to purity. Thus, it will be evident that it is best to avoid such iron containing phase. It should be noted that, if iron is controlled so as to be present in the alloy as indicated above, the iron can be reduced in one stage of the process of the present invention to less than about 1 ppm after the treatment with HCl, for example. However, if iron is permitted to exceed these limits, then there can be a considerable increase in the impurity level encountered in the silicon crystals. For example, if iron is present at 3 wt.% in the alloy being subjected to fractional crystallization, then the amount of iron present in the crystal bed will be very high and even after leaching, the level of iron tends to remain higher than desirable from the standpoint of providing purified silicon.

Figure 4:
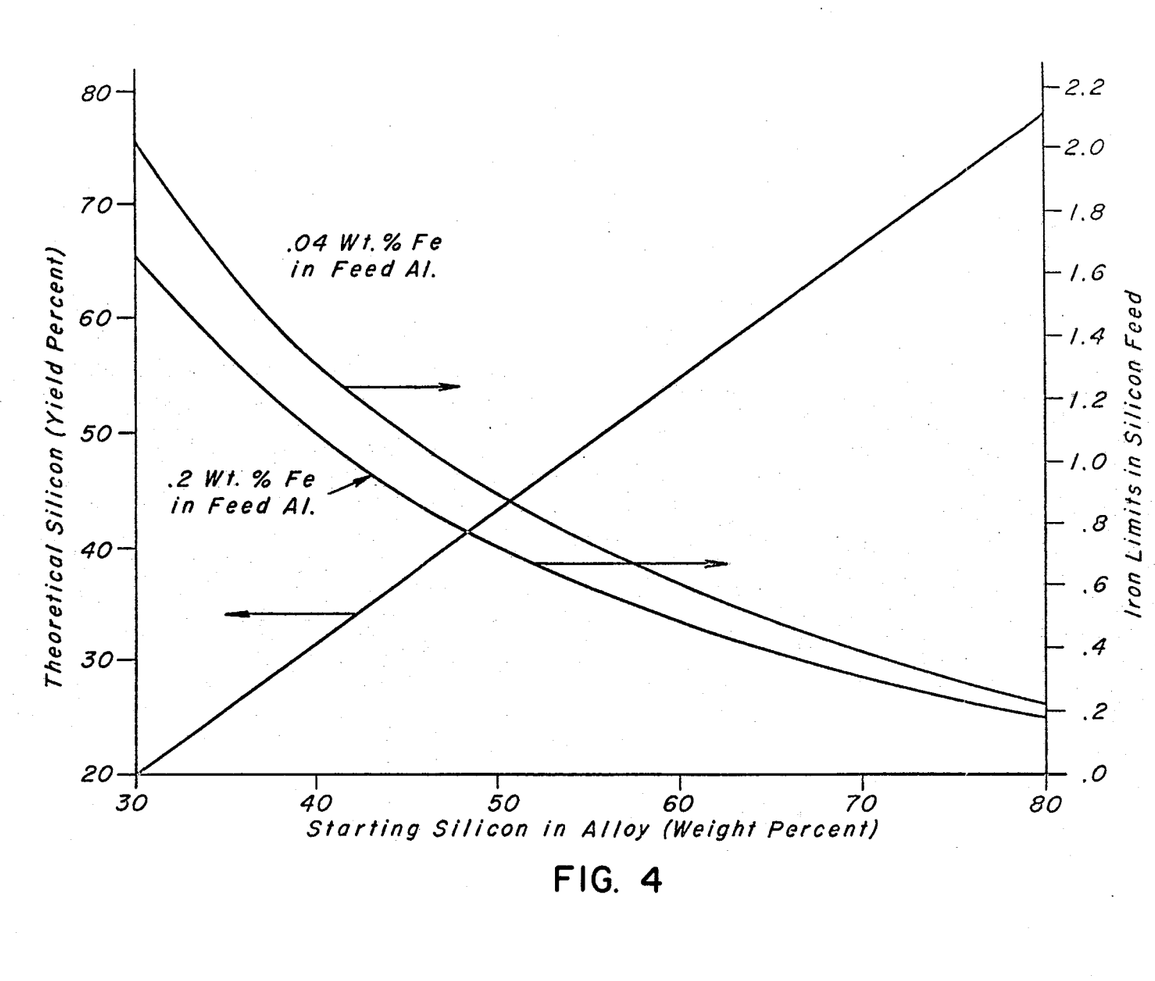
FIG. 4 is a chart showing yield of silicon and iron limits versus starting silicon in an alloy.

From the above it can be seen that control of impurities such as iron is very important in the process of the present invention in order that high yields of high purity silicon product may be obtained economically. Thus, it will be appreciated that it is important to control iron in the materials that make up the molten body to the subjected to fractional crystallization. That is, if 99.0 wt.% Si and commercial grade aluminum is used to make up the molten body, iron should be controlled both in the silicon and aluminum for purposes of obtaining maximum yield. If iron is high in the source of silicon used, then the aluminum used should be selected with respect to iron, for example, to maximize the yield of silicon which can be obtained from the process without encountering the less preferred iron-aluminum-silicon crystal phases. By reference to FIG. 4, the importance of adhering to iron control guidelines can be seen more clearly. For example, if it is desired to purify 99.0 wt.% Si having about 0.5 wt.% Fe therein, the remainder impurities, it can be determined how much aluminum has to be added and the level of iron therein which can be tolerated in order to purify the silicon in accordance with the preferred aspects of the present invention. Accordingly, from FIG. 4, it will be seen that if the aluminum to be added to the silicon has 0.04 wt.% Fe, then the starting silicon in the alloy can be as high as 63 wt.%, providing a yield of purified silicon of about 58% without encountering detrimental amounts of iron. By comparison, if the iron content of the aluminum is 0.2 wt.%, then the starting silicon in the alloy is about 59% and the yield about 53% of the purified silicon. FIG. 4 assumes that during the crystallization process, the molten alloy is cooled to a few degrees above the eutectic temperature. As noted earlier, the higher the crystallization process is kept above the eutectic temperature, the greater the amount of iron which can be tolerated in the process.

Another impurity which should be reduced to a low level is boron since its presence may be considered to be harmful in photovoltaic cells. When purified silicon is to be used in semiconductor applications, boron is normally required to be kept very low and often can be required to be 0.1 ppm or less for some applications. However, it has been found that while the fractional crystallization step does result in significant boron removal, it can be desirable to supplement such method. Thus, providing the silicon-rich aluminum alloy with a metal selected from the group consisting of titanium, vanadium and zirconium can lower the amount of boron to a very low level. That is, the provision of titanium, vanadium or zirconium in the silicon-rich alloy in molten form results in a boron containing reaction product being precipitated. The reaction product will settle to the bottom of the molten alloy and can be removed or separated in this way.

The preferred metal utilized to treat the melt to remove boron is titanium. The amount of titanium added should not exceed 0.2 wt.% and preferably 0.1 wt.%. It is important that these limits be adhered to since excessive amounts of titanium can result in intermetallic crystals being formed during the fractional crystallization step in a way similar to that encountered for iron.

In treating a silicon-rich aluminum alloy to remove boron, the alloy is first melted and the temperature kept relatively close to the melting point. That is, for purposes of removing boron, the efficiency of removal is aided at the lower temperatures. Thus, normally the temperature should not exceed the melting point of the silicon-rich alloy by more than about 100° C. It will be appreciated that for an aluminum-silicon system the melting point can vary from about 580° C. to about 1420° C., depending on the purity of the silicon alloy to be beneficiated. Also, it should be noted that in a silicon-aluminum system at a melting point of about 580° C. the alloy would be high in aluminum and low in silicon. That is, in an aluminum-silicon system at about 580° C., silicon would comprise about 12.6 wt.%, with the remainder aluminum and impurities. Further, it should be noted that for purposes of fractional crystallization in the present invention, silicon would also be greater than about 12.6 wt.% in an aluminum-silicon system.

The metal may be added in an amount in excess of that required to react with boron since the excess can be removed advantageously in the fractional crystallization step. For purposes of removing the reaction product, the melted alloy should be permitted to stand or remain in a quiescent state for about 1 to 4 hours for purposes of permitting the reaction product to settle. Thereafter, it may be separated from the melt. Other methods of removing the reaction product such as filtering or carrying the reaction product to the surface of the melt with a cooling gas, discussed later, are contemplated to be within the purview of the invention.

It is preferred to remove the boron from the silicon-rich alloy rather than removing it at a later time when the silicon has been substantially beneficiated since this avoids the possibility of contamination with the boron removing metal after the crystallization step.

Another constituent which does not respond well or is not sufficiently removed during fractional crystallization is phosphorous which is an important impurity with respect to solar grade silicon. That is, for silicon to be useful in solar applications, phosphorous should be removed to a very low level. In accordance with one aspect of the present invention, it has been discovered that if the silicon-rich alloy in a molten state is treated with a source of chlorine, phosphorous is removed to a very low level. A preferred source of chlorine suitable for use in the present invention is $Cl_2$. However, other chlorine bearing materials such as $COCl_2$ and $CCl_4$ may be used. Preferably, the source of chlorine is in gaseous form.

In the process of treating silicon to remove phosphorous, the silicon is first dissolved in a molten metal solvent, e.g. aluminum, as noted earlier, to provide a molten body of about 50 wt.% and 50 wt.% aluminum, for example. Chlorine gas is added at the bottom of the molten body and bubbled therethrough (see FIG. 3) for a period of time to remove the phosphorous by concentrating it at the surface of the melt with skim which may be in the melt. Thereafter, the molten body can be subjected to fractional crystallization for purposes of forming silicon crystals.

In addition to iron and boron, other impurities should be controlled. For example, titanium should be controlled as noted earlier. Other examples of metals which should be controlled carefully include manganese and chromium, where the maximum amounts should be less than about 2 wt.% and 0.4 wt.%, respectively. That is, impurities other than the solvent metal, e.g. aluminum, with respect to silicon should be kept to a level which does not permit them to form intermetallic compounds during the fractional crystallization step in the same way as discussed with respect to iron. Formation of such compounds, as noted earlier, can result in considerable difficulty in lowering the purity to a desirable level. For example, it has been found that titanium is not readily removed by treating the crystal bed with hydrochloric acid which is a common treatment used to take the aluminum and substantial amounts of iron out of the crystals. However, it will be understood that, as with iron, if, during the process, the temperature is kept well above the eutectic temperatures, larger amounts of impurities can be tolerated in the system without formation of intermetallic compounds during crystallization and their attendant problems with respect to purification.

With respect to the fractional crystallization aspect of the invention, it will be understood that in one embodiment heat is extracted from the molten silicon-rich body to provide a solid phase containing silicon in crystal form having high purity by concentrating impurities with respect to silicon in the molten phase. The limitation on the present invention with respect to starting temperatures is controlled in one aspect by the amount of silicon present in the molten alloy. That is, the higher the silicon content the higher the melting point of the alloy and consequently the starting temperature from which the body is cooled. Of course, the higher the silicon content of the starting alloy, the greater the yield of purified silicon crystals, particularly when the temperature is reduced to or close to the eutectic temperature of the system. For example, it will be noted that at an alloy concentration of about 90 wt.% Si, the starting temperature, or melting point, will be about 1370° C. Operating at this temperature may prove to be difficult only because of material restrictions and the tendency to form oxides or nitrides. Otherwise, it is believed that such operation is perfectly feasible and can provide large yields of high purity silicon crystals.

In one preferred embodiment of the fractional crystallization process, a body 8 of the silicon-rich metal from which silicon is to be recovered is provided in a molten state (FIG. 2), the body having a free upper surface area 10 from which heat can be extracted for purposes of forming the solid phase containing the silicon crystals. The body is contained in a vessel 60 having an insulating wall 62 which may be heated if desired. It is preferred that little or no heat loss be permitted through the walls of the vessel in order to avoid freezing or permitting silicon crystal formation thereon. The container, preferably, has a layer 64 comprising powdered alumina which provides a barrier to molten metal which may escape through inside wall 66. Wall 66 should comprise a material which will not act as a source of contaminant to the molten body 8. When the solvent is molten aluminum, wall 66 is preferably constructed from high purity alumina-based refractories, i.e. at least 90 wt.% and preferably 92 to 99 wt.% alumina. One such refractory may be obtained from Norton Company, Worcester, Mass., under the designation Alundum VA-112 or LA-85215. This material is provided in wall 66 in powdered form, compacted, and then sintered thereby giving it rigidity. This forms a monolithic lining which is less likely to be penetrated by molten aluminum and thus is more suitable for use with the system, as will be described below.

Figure 2:
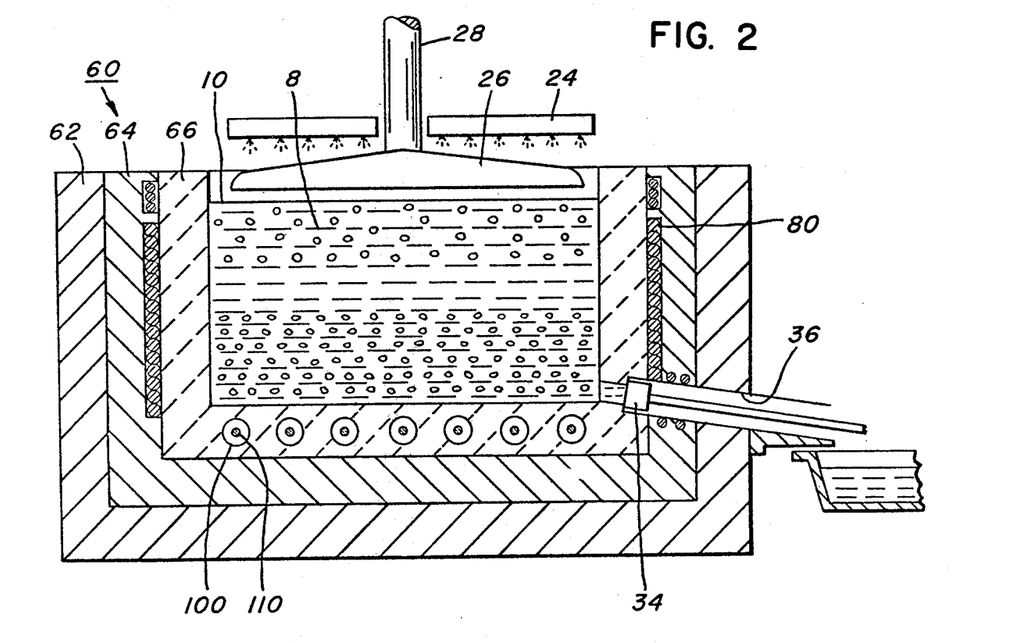
FIG. 2 illustrates schematically a sectional elevation of a crystallization furnace for use in the process of the present invention.

Heat removal through free surface 10 from the silicon-rich body of molten metal can be suitably controlled by use of gas cooling. That is, a gas such as air may be made to impinge on or pass over surface 10 by gas cooling means 24 for purposes of solidifying silicon crystals in a layer at or substantially parallel and adjacent to surface 10, as schematically illustrated in FIG. 2.

Figure 3:
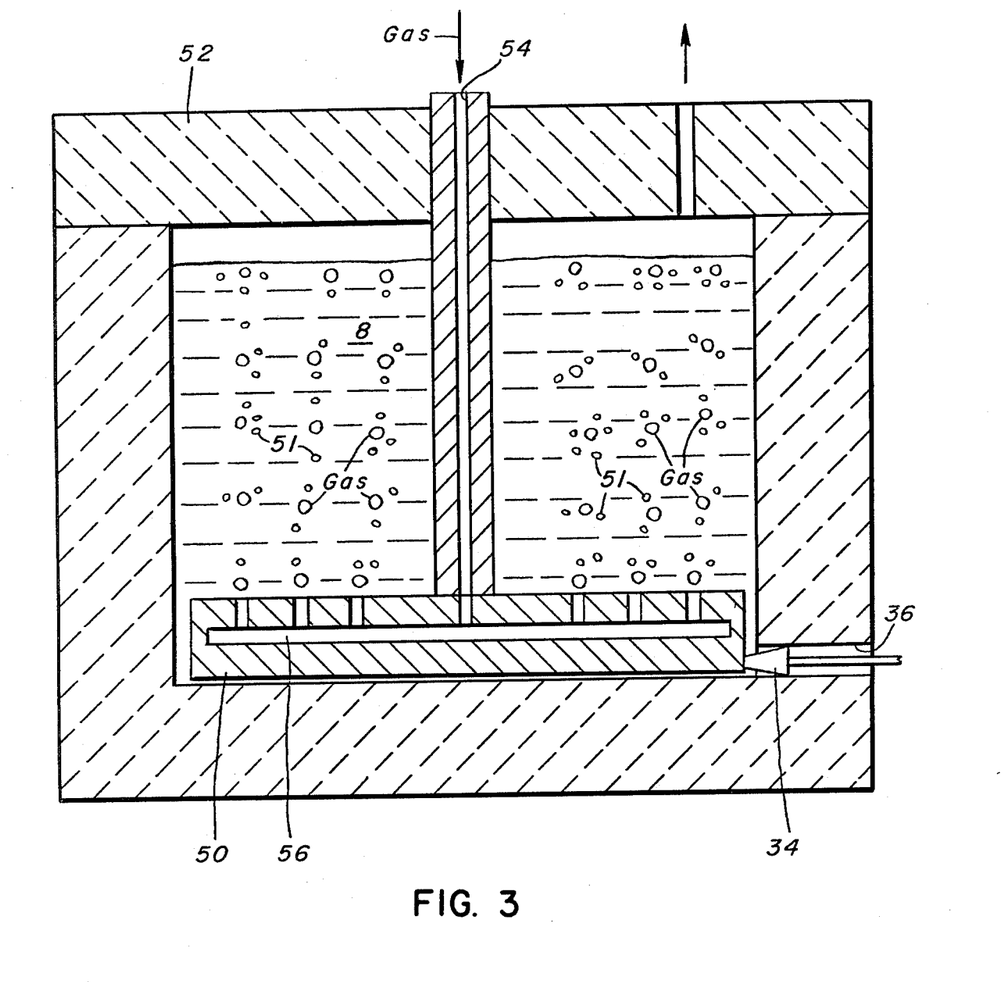
FIG. 3 is a sectional elevation of a crystallization furnace illustrating means for introducing gases to the furnace.

In an alternate embodiment, heat may be removed by bubbling a gas through body 8 substantially as shown in FIG. 3. Silicon-rich body 8 of molten metal is provided in a vessel or container similar to that shown in FIG. 2. There is provided in the body a gas dispersing means 50 which permits an inert gas, e.g. argon or a gas inert with respect to silicon and aluminum, to be introduced and bubbled therethrough to remove heat. Also, there is provided a cover 52 for purposes of preventing the gases from escaping to the atmosphere. Thus, in accordance with the invention, gas may be introduced through conduit 54 and passed along to plenum 56 from where it is introduced to the molten metal. The gas cools the metal, and crystals of silicon 51 are believed to be formed adjacent the gas bubble and the molten metal interface, as depicted in FIG. 3. Dispersing means 50, as well as permitting gas cooling, can be used for removal of silicon crystals by having it mounted by means which permit withdrawal upwardly out of the vessel (not shown). It will be noted that remelting substantially all of the crystals for purposes of their removal from the vessel can be uneconomical because of the high temperatures required.

During the extraction of heat from the body a certain amount of mixing action is beneficial. Such mixing action may be satisfied by subjecting the crystals formed to a tamping action using blade 26 (FIG. 2) by which the crystals at or near the surface of the molten metal are forced underneath. That is, the tamping action breaks up massive crystal formations which may form at the surface and displaces such crystals downward, thereby permitting fresh silicon-rich metal to be brought towards the surface. A tamping action may be carried out during crystallization on the order of about 10 to 40 times per minute. Further, it will be understood that other types of mixing action may be employed. For example, the mixing action which is obtained by introducing cooling gas to the body of molten metal (FIG. 3) may be employed. By reference to FIG. 2, blade 26 is shown mounted on shaft 28 which may be used for purposes of tamping in accordance with the invention.

It should be noted that as presently observed, crystals formed have a density generally similar to that of the molten metal and, therefore, tend to float, particularly when aluminum is used as the solvent metal. That is, there seems to be no substantial accumulation of crystals at the bottom of the vessel even after the tamping action displaces them in that direction. Rather, the crystals appear randomly dispersed throughout the body of molten metal with the greater concentrations accumulating at or near the surface.

After crystallization has proceeded to a desired point, the molten metal remaining is separated from the silicon crystals, preferably by draining. This may be accomplished by removing plug 34 from opening 36 and permitting residual molten metal containing impurities to be drained therefrom. It will be appreciated that this is an important aspect of the invention since in this way a substantial amount of the impurities are removed. Further, it will be understood that a large part of the solvent metal can be removed in this way, obviating the uneconomical and difficult step of attempting to leach solidified metal from the crystals using large quantities of hydrochloric acid, for example. In the process of the present invention, it is preferred to remove as much solvent metal, including impurities, as possible while maintaining the temperature of the crystal body preferably above the eutectic temperature. It should be noted that it is advantageous to keep the molten metal temperature somewhat above the eutectic temperature for purposes of ease of draining. This may be accomplished in part by use of resistance wires or globars 110 contained in tubes 100 (FIG. 2). In addition, during draining, it is preferred that the crystals remaining be subjected to a compacting action for purposes of having a high removal of molten metal. During compacting it is preferred that the temperature of the silicon crystals be maintained above that of the melting point of the eutectic temperature (about 578° C. for silicon-aluminum system), typically about 5° to 50° C., although higher temperatures are not considered adverse and can be beneficial, as explained later. It will be noted that draining the crystals in this way removes a considerable part of the remaining molten metal. However, a residual amount of the molten metal wets or clings to the crystals and can constitute up to 50 wt.% of the bed with typical amounts being about 30 wt.%, depending to some extent on the alloy used. It is desired that such molten metal be reduced to a minimum since it is not only an impurity with respect to silicon but also contains many impurities. Accordingly, it has been discovered that pressing or compacting the crystals aids in removing residual molten metal in the crystal bed.

Compacting may be expeditiously carried out utilizing blade 26, FIG. 2. Thus, to facilitate draining of molten metal from vessel 60, blade 26 is lowered to contact the crystal bed and pressure is applied. A suitable hydraulic means may be used for lowering and applying a controlled amount of pressure. An amount of pressure which provides suitable results is on the order of 10 to 30 lbs/in.

As has been noted above, in draining the molten metal from the vessel, a certain amount of it remains adhering to the surface of the crystals. Thus, for purposes of providing high purity silicon economically, the amount of metal remaining must be lowered as far as possible. In the aluminum-silicon system the phase remaining in the crystal bed is comprised mostly of aluminum and silicon. The aluminum present in the phase may be removed by treatment with a solution of hydrochloric acid. However, in an important aspect of the invention, the silicon crystals having the aluminum-silicon phase adhering thereto are subjected to a controlled heating process for purposes of remelting the phase and a small portion of the silicon crystals. This provides a silicon crystal bed where the solvent metal will generally not constitute more than 15 wt.% of the bed. The remelting can take place by melting an upper portion of the crystal bed and permitting the portion to drain through the remaining portion of the bed thereby removing a portion of the aluminum-silicon phase adhering to the silicon crystals. However, heating of the crystals as by impinging gas fired flames on the top of the crystal bed can result in oxide formations, freezing of the bottom of the bed and being required to remelt all of the crystals for removal.

In a preferred embodiment, the body of silicon crystals containing the metal-silicon phase, e.g. aluminum-silicon, are subjected to a heating process which is effective in heating the entire body more uniformly than top heating. That is, it is preferred to control the heat input to ensure that the entire body is heated at about the same rate. This may be accomplished by use of electrical heating, for example. When electric current is caused to flow through the body, the aluminum-silicon phase (as distinguished from the silicon crystals) is preferentially heated and a portion of the solid phase is melted. Preferential heating occurs because the resistivity of the aluminum-silicon phase remaining between or clinging to the crystals is much less than the silicon crystals. Typically, the aluminum-silicon phase including impurities has a resistivity on the order of about 30 micro-ohms-cm and the silicon crystals have a much higher resistivity, i.e. over 3000 micro-ohms-cm, for example. Thus, since the aluminum-silicon phase remaining between and on the crystals is believed to be more or less interconnected throughout the crystal bed and has a relatively high electrical and thermal conductivity, preferably the electric current flows through the aluminum-silicon phase and permits more uniform heating than top heating. It will be appreciated that concentrating the heat largely in the solvent metal phase results in a higher level of purity while only slightly diminishing the yield of crystals since only a small fraction of the crystals will be dissolved.

The preferred method of heating the phase adhering or remaining in the crystal bed is by use of induction heating although there can be instances where resistance heating may be quite feasible. By reference to FIG. 2, there is shown a coil 80 which is fabricated to operate in conjunction with a fractional crystallization vessel for purposes of electrically inducing heat in the bed. In FIG. 2, vessel 60 is shown with induction coil 80 located just above and around taphole 36 on one side and extending to the bottom on the opposite side. The coil is shown to be wrapped around the vessel and is extended up the sides to a height which would approximate that of the crystal bed. It will be seen from FIG. 2 that the induction coil may be located under insulation layer 62.

While induction heating is used for producing more uniform heating, it should be noted that in certain instances greater amounts of heat may be encountered at or adjacent the wall of the vessel than throughout the bed. This phenomena, which can be controlled to a certain extent, can have the advantage that any crystals and alloy phase adhering to the wall of the vessel can be melted easily, permitting ease of removal of the remainder of the crystal bed, if desired, without fear of refractory wall damage.

Heating adjacent the wall in an induction system depends to some extent on the frequency of the current in the induction coils. For example, high frequency systems, e.g. 10,000 CPS, are more apt to produce greater amounts of heat adjacent to or in the proximity of the wall than low frequency systems, e.g. 180 CPS. The frequency which is used in commercial operations preferably ranges from about 60 CPS to about 180 CPS, with the higher frequencies being on a less preferred basis because of loss of uniform heating. However, high frequencies are required when a small vessel is used to obtain adequate heating. For example, a vessel having only a 5-10 lb. charge capacity can require a frequency from 1,000 to 10,000 CPS which has been found to be more efficient than alternate heating methods.

To aid in extracting the remelted aluminum-silicon phase, preferably the silicon crystals are subjected to a compacting action substantially similar to that noted earlier. In one aspect of the remelting step, the compacting pressure may be applied substantially simultaneously with the melting step, particularly when induction heating is used. That is, it will be appreciated that both compacting and heating can be used simultaneously, thereby effectively squeezing a substantial amount of remelted material from the crystals, including impure solvent phase as well as silicon from partially remelted crystals. It will be understood that the compacting action may be performed subsequent to the start of induction heating. In any event, the solvent metal remaining will generally not constitute more than 10 wt.% of the bed, and preferably the solvent metal is reduced to constitute not more than 2 wt.% of the crystal bed.

During heating of the crystals and impure phase remaining between the crystals, the melted portion may be drained from the crystal bed substantially on a continuous basis or in some instances on an intermittent basis. The temperature of the crystal bed at which the melted portion is removed is preferably in the range of about 750° to 1300° C. The intermittent draining has the advantage of placing the crystals in the bed in a melt of increasing purity. This can aid purification by permitting melt of a higher purity to be in contact with the crystals in the bed. While the inventor does not necessarily wish to be bound by any theory of invention, it is believed that permitting high purity melt to be in contact with the crystals results in mass transfer of impurity from the crystal to liquid thereby further increasing the purity of the crystals.

The following examples are further illustrative of the invention.

EXAMPLE 1

Silicon of about 99.0 wt.% purity was added to aluminum of about 99.9 wt.% purity to provide a 2000-pound mixture of about 25 wt.% silicon and about 74 wt.% aluminum, the remainder impurities. The silicon was dissolved in the aluminum by heating to about 850° C. in a container substantially as shown in FIG. 2. The height of melt in the vessel was about 18 inches. After the silicon was dissolved, the mixture was cooled at about a rate of 2° C./minute until the temperature of the mixture was about 585° C. The cooling was accomplished by use of air which was made to impinge on the surface of the liquid mixture substantially as shown in FIG. 2. During cooling and in order to aid in heat removal, a tamper blade, shown in FIG. 2, was displaced downwardly at about a rate of 30 times/minute to push crystals away from the surface and to provide some mixing action. A sample of crystals formed were removed from the vessel and found to contain about 74 wt.% aluminum. Thereafter, aluminum was drained from the crystal bed while the bed was maintained at a temperature of about 580° C. to assist in the aluminum removal. Analysis showed that after draining, aluminum remaining in the crystal bed was about 49 wt.%. From this experiment it can be seen that a beneficial effect is obtained from draining as compared to merely lifting silicon crystals out of the vessel. Accordingly, the amount of aluminum to be removed from the crystals after draining has been diminished.

EXAMPLE 2

This example was carried out as in Example 1 except that after draining, the bed of crystals and aluminum contained therein were partially remelted by impinging a gas fired flame on the surface of the bed. The amount of aluminum contained in the bed was lowered on an average to an amount of about 42 wt.%. However, in certain regions of the bed the aluminum content had decreased dramatically. For instance, at the center toward the top of the bed the aluminum content was found to be 7 wt.% and peripheral regions toward the top aluminum content was found to be about 19 wt.%. This example demonstrates that the aluminum content of the crystal bed can be lowered substantially by the application of heat. The difference in the amount of aluminum found was attributed to the difficulty in heating the total bed uniformly. For instance, it was found that during remelting the temperature adjacent the surface was over 900° C. while the bottom was only about 700° C.

EXAMPLE 3

This example was performed to determine if the crystal bed and aluminum therein could be heated more uniformly for the purpose of effecting a better separating of aluminum and impurities from the silicon crystals. Accordingly, a melt containing 33.4 wt.% silicon (metallurgical grade), the remainder aluminum and impurities, was prepared, the melt being provided in a small vessel having a five-pound capacity. After heat was extracted from the unit and the temperature was lowered to about 580° C., the alloy was drained. Because of the small size of the unit, only a relatively small amount of molten material was removed. The remaining crystals and alloy were then subjected to induction heating for purposes of achieving greater separation of aluminum from the silicon crystals. Using a 30 Kw induction power supply at 10,000 CPS, the temperature in the bed was increased more or less uniformly to about 1100° C. After draining, only about 35 wt.% aluminum remained in the crystal bed.

The results of this example clearly demonstrate that the aluminum alloy contained in the crystal bed can be uniformly heated to provide a molten portion which can be easily separated from the silicon crystals. Using a larger vessel, e.g. 2000 pound capacity, a much greater separation can be obtained. In using such a vessel, a 250 Kw induction power supply may be used at about 180 CPS in which the temperature in the bed can be raised to about 1000° C. in about 30 to 45 minutes. Using a tamper blade to squeeze the crystals during the initial drain and during induction heating, only about 12.0 wt.% aluminum, on a calculated basis, should be found to remain in the entire crystal bed. It should be noted that material drained resulting from induction heating can be high in silicon, e.g. 45 wt.%, since there can be some melting of the silicon crystal. Such material may be incorporated in a later melt to be crystallized.

From the above, it can be seen that in the process of purifying silicon by crystallization, the solvent metal, e.g. aluminum, can be removed to a very low level in the crystal bed. Aluminum remaining in the bed can be easily dissolved from the crystals using hydrochloric acid thereby providing a system that is highly economical since only a very small amount of hydrochloric acid is required and there is no wastage of aluminum by virtue of large amounts thereof being dissolved in the acid. Further, in the case where aluminum is used as the solvent to upgrade the silicon, the molten material first drained after crystallization is useful in aluminum castings, for example, further adding to the economies of the system.

While the invention has been described in terms of preferred embodiments, the claims appended hereto are intended to encompass other embodiments which fall within the spirit of the invention.

What is claimed is:

1. A method for providing a bed of purified silicon crystals wherein silicon is crystallized from a solvent metal and the amount of solvent metal remaining in the crystal bed is reduced to a low level, the method comprising the steps of:
   (a) providing a molten body containing silicon and at least one metal selected from the group consisting of tin, zinc, aluminum, silver and lead, the silicon being present in an amount greater than the eutectic point of the silicon-metal combination, the metal adapted to act as a solvent for the silicon, said molten body containing Fe, Ti, Mn and Cr impurities at levels not greater than 1.5 wt.%, 0.2 wt.%, 2 wt.% and 0.4 wt.%, respectively, wherein intermetallic compounds containing these impurities, Si and said metal are avoided during subsequent crystallization;
   (b) extracting heat from the body to provide a solid phase containing silicon in crystal form and to concentrate impurities in a molten phase;
   (c) thereafter, removing a substantial part of the molten phase from the solid phase containing said silicon crystals;
   (d) subjecting the solid phase to a melting action to melt a fraction of the solid phase for purposes of removing metal-silicon adhering to said crystals; and
   (e) draining the molten phase from the solid phase to separate at least a fraction of the metal-silicon combination adhering to said crystals of silicon.

2. The method according to claim 1 wherein the metal is aluminum.

3. The method according to claim 1 wherein the level of iron impurity in said body is such that double saturation line A–B of FIG. 1 is avoided.

4. The method according to claim 1 wherein the iron impurity in said body is not greater than about 0.8 wt.%.

5. A method for providing a bed of purified silicon crystals wherein silicon is crystallized from aluminum and the amount of aluminum remaining in the crystal bed is reduced to a low level, the method comprising the steps of:
   (a) providing a molten body containing from 20 to 80 wt.% silicon, the remainder aluminum and impurities, said molten body containing Fe, Ti, Mn and Cr impurities at levels not greater than 0.8 wt.%, 0.2 wt.%, 2.0 wt.% and 0.4 wt.%, respectively, wherein intermetallic compounds containing these impurities, silicon and aluminum are avoided during subsequent crystallization;
   (b) extracting heat from the body to provide a solid phase containing silicon in crystal form and to concentrate impurities in a molten phase, the heat being extracted to a level which lowers the temperature of the body to about 580° C.;
   (c) thereafter, removing a substantial part of the molten phase from the solid phase containing said silicon crystals;
   (d) subjecting the solid phase to a melting action to melt a fraction of the solid phase for purposes of removing aluminum-silicon adhering to said crystals; and
   (e) draining the molten phase from the solid phase to separate at least a fraction of the aluminum-silicon combination adhering to said crystals of silicon.

6. The method according to claim 5 including maintaining the walls confining the body at a temperature sufficiently high to prevent precipitation of silicon crystals thereon.

7. The method according to claim 5 wherein heat is extracted from the body by at least one of bubbling gaseous material therethrough and impinging a gaseous material on a free surface contained therein.

8. The method according to claim 5 including, during extracting heat, subjecting the body to a mixing action.

9. The method according to claim 5 including removing a substantial part of the molten phase from the solid phase by draining, while maintaining the solid phase at a temperature of at least 580° C. and while subjecting the solid phase to a compacting action for purposes of minimizing the amount of liquid remaining therein.

10. A method for providing a bed of purified silicon crystals wherein silicon is crystallized from aluminum and the amount of aluminum remaining in the crystal bed is reduced to a low level, the method comprising the steps of:
(a) providing a molten body containing 20 to 80 wt.% silicon, the remainder aluminum and impurities, said molten body containing Fe, Ti, Mn, and Cr impurities at levels not greater than 0.8 wt.%, 0.2 wt.%, 2.0 wt.% and 0.4 wt.%, respectively, wherein intermetallic compounds containing these impurities, silicon and aluminum are avoided during subsequent crystallization;
(b) treating the body with a gas to remove heat therefrom to provide a solid phase therein containing silicon in crystal form and to concentrate impurities in an aluminum molten phase, the heat being extracted to lower the temperature of the body to a temperature in the range of about 577° to 660° C.;
(c) during the heat removing step, subjecting the body to a mixing action;
(d) thereafter, removing a substantial part of the molten phase from the solid phase containing said silicon crystals by draining while maintaining the solid phase at a temperature in the range of 577° to 650° C. and subjecting the solid phase to a compacting action for purposes of minimizing the amount of liquid remaining therein;
(e) subjecting the solid phase to a melting action to melt a fraction of the solid phase for purposes of removing a substantial amount of aluminum-silicon combination adhering to said crystals; and
(f) draining the molten phase from the solid phase to separate at least a fraction of the metal-silicon combination adhering to said crystals of silicon.

* * * * *